United States Patent [19]

Ide

[11] Patent Number: 5,620,539
[45] Date of Patent: Apr. 15, 1997

[54] PNEUMATIC RADIAL TIRE WITH RUBBER CHAFER, STIFFENER AND SIDEWALL-REINFORCING RUBBER LAYER

[75] Inventor: Keita Ide, Tokyo, Japan

[73] Assignee: Bridgestone Corporation, Tokyo, Japan

[21] Appl. No.: 569,984

[22] Filed: Dec. 8, 1995

[30] Foreign Application Priority Data

Dec. 9, 1994  [JP]  Japan ................................ 6-306530
Nov. 22, 1995 [JP]  Japan ................................ 7-304413

[51] Int. Cl.$^6$ ............................ B60C 9/00; B60C 15/00;
                                    B60C 15/06; B60C 9/08
[52] U.S. Cl. ........................ 152/541; 152/539; 152/543;
                                    152/555
[58] Field of Search ................................ 152/555, 564,
                                    152/543, 539, 541

[56] References Cited

U.S. PATENT DOCUMENTS 4,019,551   4/1977   Kolowski et al. .................. 152/543 X Primary Examiner—Adrienne C. Johnstone
Attorney, Agent, or Firm—Sughrue, Mion, Zinn, Macpeak & Seas

[57] ABSTRACT

A pneumatic radial tire comprises a radial carcass ply toroidally extending between a pair of bead cores, a stiffener disposed above each bead core between the carcass ply and its turnup portion, and a rubber chafer arranged outside the turnup portion, provided that a ratio of cross-sectional area of the stiffener to cross-sectional area of the rubber chafer is not more than 0.5. In this tire, a sidewall-reinforcing rubber layer having a JIS A hardness of not less than 80° is arranged along the carcass ply in a region ranging from a crown portion of the carcass ply to the bead core.

4 Claims, 3 Drawing Sheets

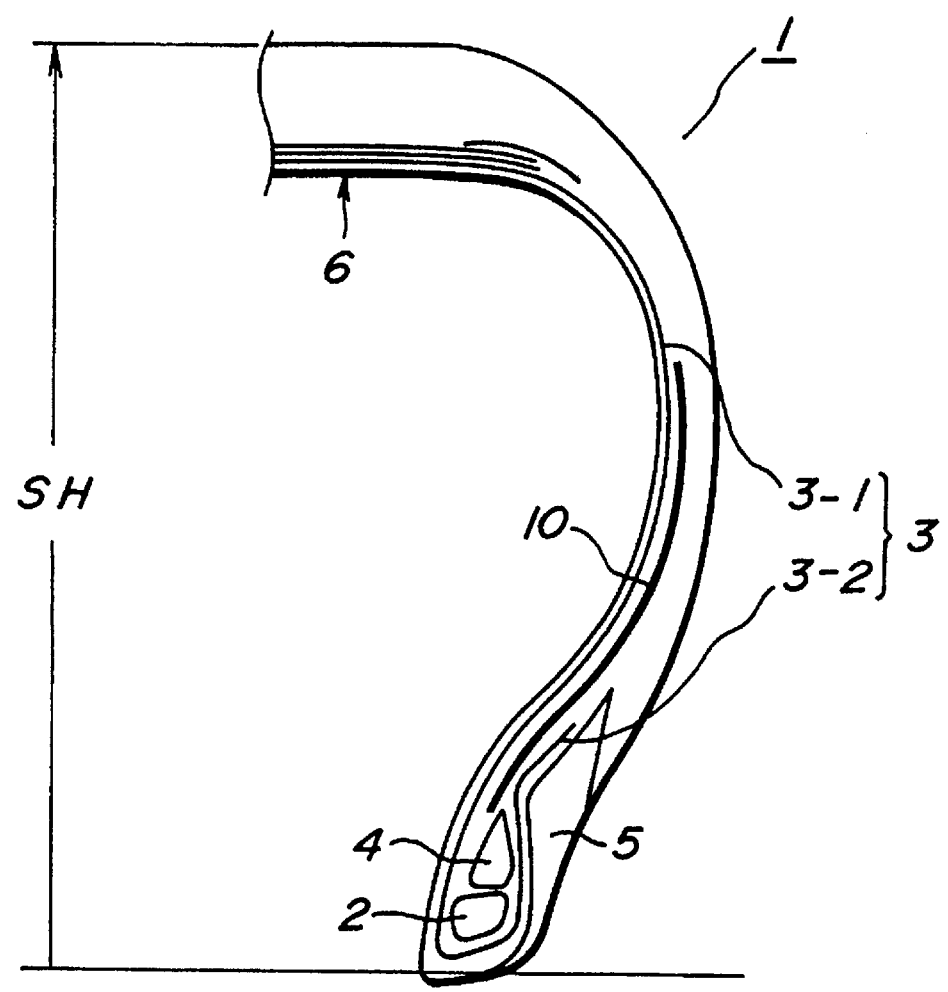
FIG_1

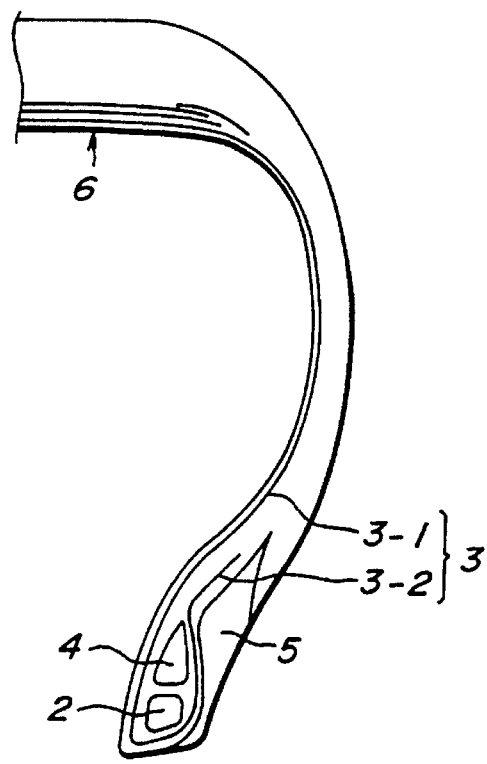
FIG._2 COMPARATIVE
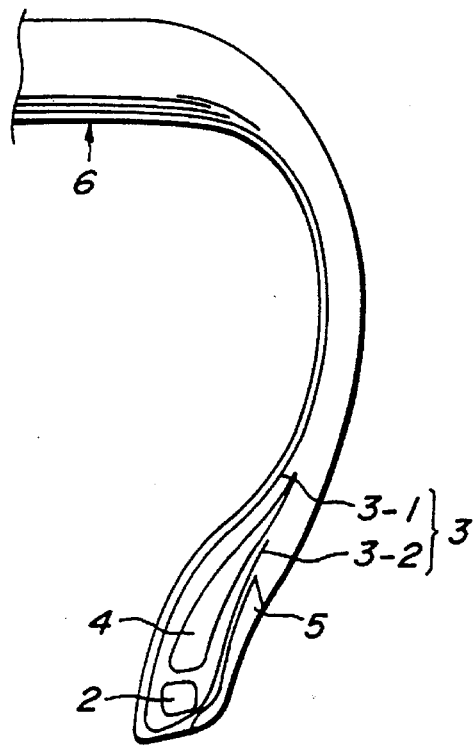
FIG._3 PRIOR ART

FIG_4
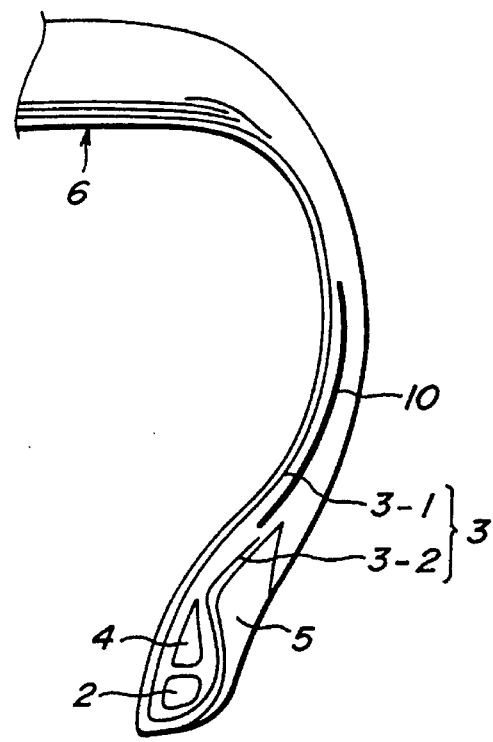
FIG_5
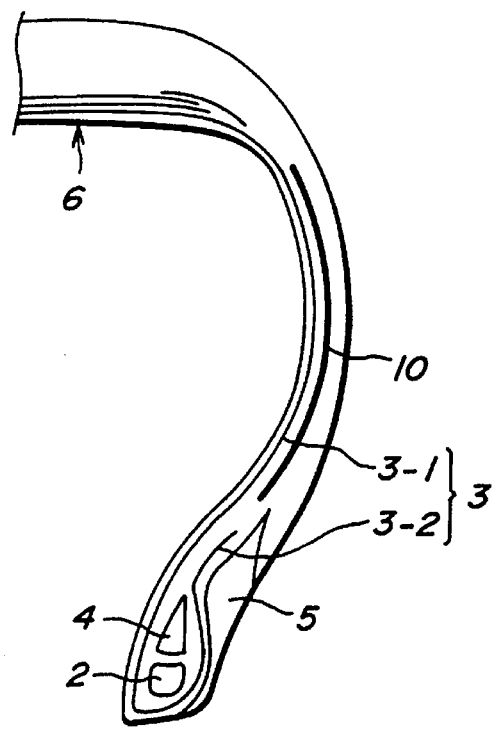

PNEUMATIC RADIAL TIRE WITH RUBBER CHAFER, STIFFENER AND SIDEWALL-REINFORCING RUBBER LAYER

BACKGROUND OF THE INVENTION

1. Field of the Invention

This invention relates to pneumatic radial tires, and more particularly to a pneumatic radial tire for a passenger car simultaneously establishing a reduction of rolling resistance and an improvement of steering stability.

2. Description of the Related Art

Recently, needs for a reduction of fuel consumption in vehicles from a viewpoint of environmental protection have considered attempts for reducing the rolling resistance in tires. In this connection, there have hitherto been attempted various proposals for reducing the rolling resistance of the tire. An example of these proposals is a tire shown in FIG. 2.

When this tire is compared with the conventionally used tire shown in FIG. 3, a cross sectional area of a stiffener 4 having an approximately triangular shape is made small to lower a height of the stiffener. A turnup portion 3-2 of a carcass ply 3 is wound around a bead core 2 from inside toward outside is extended adjacent to a carcass ply body 3-1 from a position lower than that of the tire shown in FIG. 3. On the other hand, a cross sectional area of a rubber chafer 5 is made large and a thickness of the rubber chafer 5 is made maximum in the vicinity of an outward end of the stiffener 4 in the radial direction of the tire. The rubber chafer 5 is extended outward over the stiffener 4 in the radial direction of the tire. Moreover, a ratio of cross-sectional area in the stiffener to cross-sectional area in the rubber chafer is not more than 0.5.

A factor reducing the rolling resistance in the tire of the above structure, first is first that a rubber material having tan δ smaller than that in the stiffener 4 is usually used in the rubber chafer 5. That is, as the ratio of the rubber material having a large tan δ occupying a portion deformed during the running under a load becomes larger, the energy consumption becomes larger or the rolling resistance becomes larger. Therefore, the occupying ratio of the stiffener 4 is made small in the tire shown in FIG. 2.

Secondly, since the occupying ratio of the stiffener 4 in the tire of FIG. 2 is small, the tire rigidity in the radial direction of the tire is lowered to make the deformation of the belt end small. That is, the belt end portion has a great influence on the rolling resistance of the tire, so that the rolling resistance can effectively be reduced by controlling the deformation of the belt end portion.

However, when the occupying ratio of the stiffener is made small in the tire of FIG. 2, the rigidity of the bead portion becomes rather insufficient and hence the steering stability is degraded. For this end, it is required to take a countermeasure for supplementing such a rigidity shortage. In this connection, it has hitherto been attempted to arrange a reinforcing member comprised of metal or organic fiber cords slantly extending with respect to the circumferential direction of the tire to wind around the bead core from inside toward outside, or to arrange such a reinforcing member outside the stiffener in the axial direction of the tire. According to these conventional techniques, the circumferential rigidity is certainly improved, but the radial rigidity is simultaneously improved to lose the effect of reducing the rolling resistance. On the other hand, when the cords in the reinforcing member are arranged substantially in the radial direction without inclining with respect to the circumferential direction, the circumferential rigidity is not increased, but the radial rigidity is increased too much, so that the rolling resistance is undesirably increased and also the noise is generated.

SUMMARY OF THE INVENTION

It is, therefore, an object of the invention to provide pneumatic radial tires reducing the rolling resistance without degrading the steering stability.

According to the invention, there is the provision of in a pneumatic radial tire comprising a radial carcass comprised of a rubberized cord ply body toroidally extending between a pair of bead cores and wound around each bead core from inside toward outside to form a turnup portion, a stiffener disposed above each bead core between the rubberized cord ply body and its turnup portion, and a rubber chafer arranged outside the turnup portion, provided that a ratio of cross-sectional area of the stiffener to cross-sectional area of the rubber chafer is not more than 0.5 and a thickness of the rubber chafer is a maximum in the vicinity of an outward end of the stiffener in a radial direction of the tire, wherein a sidewall-reinforcing rubber layer having a JIS A hardness of not less than 80° is arranged along the carcass in a region ranging from a crown portion of the carcass to the bead core.

In a preferable embodiment of the invention, an outer end of the sidewall-reinforcing rubber layer in the radial direction is located up to a position corresponding to 0.85 times of a section height of the tire as measured from a bead base of the tire.

BRIEF DESCRIPTION OF THE DRAWINGS

The invention will be described with reference to the accompanying drawings, wherein:

FIG. 1 is a diagrammatically right-half sectional view of a first embodiment of the pneumatic radial tire according to the invention;

FIG. 2 is a diagrammatically right-half sectional view of a comparative example of the pneumatic radial tire;

FIG. 3 is a diagrammatically right-half sectional view of the conventional pneumatic radial tire;

FIG. 4 is a diagrammatically right-half sectional view of a second embodiment of the pneumatic radial tire according to the invention; and FIG. 5 is a diagrammatically right-half sectional view of a third embodiment of the pneumatic radial tire according to the invention.

DESCRIPTION OF THE PREFERRED EMBODIMENTS

FIG. 1 illustrates shown a first embodiment of the pneumatic radial tire according to the invention, in which numeral 1 is a tire, numeral 2 a bead core, numeral 3 a radial carcass comprised of comprising a rubberized cord ply body 3-1 toroidally extending between a pair of bead cores 2 and wound around the bead core 2 from inside toward outside to form a turnup portion 3-2, a stiffener 4 disposed above the bead core 2 between the rubberized cord ply body 3-1 and its turnup portion 3-2, and a rubber chafer 5 arranged outside the turnup portion 3-2.

In this tire, a ratio of cross-sectional area of the stiffener 4 to cross-sectional area of the rubber chafer 5 is set to be not more than 0.5. The cross-sectional area ratio is determined by balancing the stiffener and the rubber chafer for reducing the rolling resistance while satisfying varying performances required in the tire. In the pneumatic radial tire for passenger cars, it is preferable that the cross-sectional area ratio is set to a range of 0.1–0.4, more particularly 0.2–0.3.

Since the cross-sectional area of the stiffener 4 is made small to lower the height of the stiffener in the radial direction, the turnup portion 3-2 is extended adjacent to the rubberized cord ply body 3-1 from a lower position as compared with the tire shown in FIG. 3. On the other hand, the cross-sectional area of the rubber chafer 5 is made large, so that the thickness of the rubber chafer 5 is made a maximum in the vicinity of an outer end of the stiffener 4 in the radial direction of the tire and the rubber chafer 5 is extended outward over the outer end of the stiffener 4 in the radial direction of the tire.

According to the invention, a sidewall-reinforcing rubber layer 10 is arranged in a region ranging from a crown portion 6 of the carcass 3 to the bead core 2. In this case, it is not necessary that the entire region is covered with the rubber layer 10. That is, it is enough to cover at least a part of this region with the rubber layer 10. Moreover, symbol SH is a section height of the tire as measured from a bead base of the tire.

The sidewall-reinforcing rubber layer 10 is a rubber having a JIS A hardness of not less than 80°. Since this type of the rubber is generally poor in the resistance to ozone crack, this rubber is not used on an outer surface of the tire. Moreover, the sidewall-reinforcing rubber layer 10 is arranged along the rubberized cord ply body 3-1.

As a result of the inventor's studies on a relation between tire rigidity and steering stability, the invention is based on the following knowledge.

That is, tire rigidity can be considered to be divided into lateral rigidity to the movement of the tire in right and left directions, radial rigidity to up and down movements in the radial direction of the tire, and circumferential rigidity to the movement of the tire in the rotating direction.

Among these rigidities, the lateral rigidity contributing to the cornering and the circumferential rigidity contributing to the transmission of traction and braking forces are related to steering stability.

On the other hand, the radial rigidity has less contribution to the steering stability, while the increase of radial rigidity brings about the increase of rolling resistance. That is, as radial rigidity increases, the deformation of the belt end portion largely contributing to improve the rolling resistance becomes larger. In order to reduce rolling resistance without degrading steering stability, therefore, it is necessary that radial rigidity is lowered and only the circumferential rigidity is increased.

As previously mentioned, the conventional countermeasure of arranging the reinforcing member comprised of metal or organic fiber cords slantly extending with respect to the circumferential direction of the tire to wind around the bead core from inside toward outside, or arranging such a reinforcing member outside the stiffener in the axial direction of the tire certainly increases the circumferential rigidity. However, radial rigidity is simultaneously increased, so that the effect of reducing rolling resistance is lost.

On the contrary, according to the invention, the sidewall-reinforcing rubber layer having a JIS A hardness of not less than 80° is arranged in a region ranging from the crown portion of the carcass to the bead core along the carcass in the vicinity of central axis of bending deformation. As a result only the circumferential rigidity is effectively increased and the increase of radial rigidity is suppressed as far as possible. When the sidewall-reinforcing rubber layer is located at a position spaced from the carcass near the central axis of the bending deformation, the deformation moment in the radial direction increases during the running under load at a mixed state of radial and circumferential deformations and hence radial rigidity can not sufficiently be reduced. When the JIS A hardness is less than 80°, circumferential rigidity can not sufficiently be increased.

In this invention, it is preferable that the sidewall-reinforcing rubber layer is arranged along the carcass in the vicinity of the central axis of the bending deformation and outward from the carcass ply body in the axial direction of the tire in view of the improvement of the circumferential rigidity.

Moreover, it is favorable that the thickness of the sidewall-reinforcing rubber layer is not more than 5 mm in order to suppress the increase of the radial rigidity as far as possible.

When the tire of FIG. 1 is compared with the tire of FIG. 3, radial rigidity is lowered as mentioned above, so that the irregularity of road surface is hardly transmitted to the tire and hence the occurrence of noise based on the irregularity can be prevented.

When the outer end of the sidewall-reinforcing rubber layer in the radial direction of the tire is located at a position exceeding 0.85 times the tire section height as measured from the bead base of the tire, the radial rigidity of the tire undesirably increases and hence the effect of reducing the rolling resistance is lost. Therefore, the outer end of the sidewall-reinforcing rubber layer is favorably located at a position corresponding to not more than 0.85 times of the tire section height.

The following examples are given in illustration of the invention and are not intended as limitations thereof.

A pneumatic radial tire for passenger car having a tire size of 185/65R14 is prepared according to the structure shown in FIG. 1 (invention tire 1). In this case, the ratio of cross-sectional area of the stiffener 4 to cross-sectional area of the rubber chafer 5 is 0.3, and the outer end of the stiffener 4 is located at a position corresponding to 0.2 times of the tire section height SH and the outer end of the rubber chafer 5 is located at a position corresponding to 0.35 times of the tire section height SH.

The sidewall-reinforcing rubber layer 10, is a rubber sheet having a JIS A hardness of 85° and a thickness of 1 m and a width of 50 mm is arranged along the carcass to locate an outer end in the radial direction at a position corresponding to 0.65 times the tire section height SH. Further, this rubber layer is disposed among the rubberized cord ply body 3-1, the turnup portion 3-2, the stiffener 4 and the rubber chafer 5.

An invention tire 2 is prepared in the same manner as the invention tire 1 except that the width of the sidewall-reinforcing rubber layer 10 is 25 mm. As shown in FIG. 4, therefore, the inner end of the rubber layer 10 in the radial direction of the tire is not sandwiched between the rubberized cord ply body 3-1 and the turnup portion 3-2 and the stiffener 4.

An invention tire 3 is prepared in the same manner as the invention tire 1 except that the outer end of the sidewall-reinforcing rubber layer 10 in the radial direction of the tire is located at a position corresponding to 0.85 times the tire section height SH. As shown in FIG. 5, therefore, the inner end of the rubber layer 10 in the radial direction of the tire is not disposed among the rubberized cord ply body 3-1, the turnup portion 3-2, the stiffener 4 and the rubber chafer 5.

For the comparison, there are provided two comparative tires 1 and 2 and the conventional tire having the structure shown in FIG. 3.

The comparative tire 1 has the same structure as the invention tire 1 except that the sidewall-reinforcing rubber layer 10 is omitted as shown in FIG. 2.

The comparative tire 2 has the same structure as the invention tire 1 except that a reinforcing member containing aramide fiber cords of 1500 d/2 embedded at an end count of 41 cords/5 cm and inclined at a cord angle of 45° with respect to the circumferential direction is used instead of the sidewall-reinforcing rubber layer 10.

The conventional tire shown in FIG. 3 is different from the invention tire 1 due to the absence of the sidewall-reinforcing rubber layer 10 and the structures of the stiffener 4 and the rubber chafer 5. In the conventional tire, the ratio of the cross-sectional area of the stiffener to cross-sectional area of the rubber chafer is 0.9, while the thickness of the rubber chafer is gently changed in the radial direction of the tire. Further, the outer end of the stiffener in the radial direction is located at a position corresponding to 0.4 times of the tire section height, and the outer end of the rubber chafer in the radial direction is located at a position corresponding to 0.25 times the tire section height.

The rolling resistance and steering stability are evaluated with respect to these tires under the following test conditions. In the test, the tire is mounted onto a rim having a size of 5.5 J×14 and inflated under an internal pressure of 2.0 kgf/cm².

(Test for rolling resistance)

The tire is run on a drum at a speed of 150 km/h under a load of 475 kgf and then the driving of the drum is stopped to inertially rotate the drum, during which the deceleration rate is measured to determine the rolling resistance of each tire at 50 km/h. The results are shown in Table 1, in which the value of the rolling resistance is represented by an index on the basis that the control tire is 100. The smaller the index value, the better the rolling resistance.

(Test for radial and circumferential rigidities of tire)

When the rim is displaced in the radial or circumferential direction of the tire during the running of the tire on the drum under a load of 475 kgf, a displacement quantity and a force required for such a displacement are measured, from which a force per unit displacement is determined. The results are shown in Table 1, in which each of the radial and circumferential rigidities are represented by an index on the basis that the control tire is 100. The smaller the index value, the better the radial rigidity, while the larger the index value, the better the circumferential rigidity.

(Test for steering stability in actual running)

The tire is actually run on various test courses at various speeds, during which the steering stability is evaluated by a feeling test of a professional driver. The results are shown in Table 1, in which the result is represented by stages of ±5 based on the conventional tire.

(Noise test)

When the tire is actually run on rough road at 60 km/h, a noise level inside the vehicle is measured to obtain results as shown in Table 1, in which the result is represented by a level difference based on the control tire.

TABLE 1

|  | Invention tire 1 | Invention tire 2 | Invention tire 3 | Conventional tire | Comparative tire 1 | Comparative tire 2 |
| --- | --- | --- | --- | --- | --- | --- |
| Rolling resistance | 96 | 93 | 95 | 100 | 94 | 110 |
| Radial rigidity | 98 | 94 | 97 | 100 | 90 | 118 |
| Circumferential rigidity | 118 | 109 | 114 | 100 | 98 | 120 |
| Steering stability in actual running | +1 | ±0 | +1 | — | −2 | +1 |
| Noise (db) | −0.2 | −0.5 | −0.4 | — | −0.6 | ±1.2 |

As seen from Table 1, the comparative tire 1 is good in the rolling resistance and noise level but is poor in the steering stability as compared with the conventional tire, while the comparative tire 2 is good in the steering stability but is poor in the rolling resistance and noise level as compared with the conventional tire. On the contrary, all of the invention tires are excellent in the rolling resistance and noise level and good in the steering stability as compared with the conventional tire.

What is claimed is:

1. A pneumatic radial tire comprising; a radial carcass comprised of a rubberized cord ply body toroidally extending between a pair of bead cores and wound around each bead core from inside toward outside to form a turnup portion, a stiffener disposed above each bead core between the rubberized cord ply body and its turnup portion, and a rubber chafer arranged outside the turnup portion, provided that a ratio of cross-sectional area of the stiffener to cross-sectional area of the rubber chafer is not more than 0.5 and a thickness of the rubber chafer is a maximum in the vicinity of an outward end of the stiffener in a radial direction of the tire, and a sidewall-reinforcing rubber layer having a JIS A hardness of not less than 80° arranged along the carcass in a region ranging from a crown portion of the carcass to the bead core.

2. A pneumatic radial tire according to claim 1, wherein an outer end of the sidewall-reinforcing rubber layer in the radial direction is located up to a position corresponding to 0.85 times a section height of the tire as measured from a bead base of the tire.

3. A pneumatic radial tire according to claim 1, wherein the tire is a passenger car tire and the cross-sectional area ratio is within a range of 0.1–0.4.

4. A pneumatic radial tire according to claim 1, wherein the sidewall-reinforcing rubber layer has a thickness of not more than 5 mm.

* * * * *